United States Patent [19]

Mindell

[11] 4,093,142

[45] June 6, 1978

[54] FILMSTRIP CARTRIDGE

[75] Inventor: Marvin I. Mindell, Pittsford, N.Y.

[73] Assignee: The Singer Company, New York, N.Y.

[21] Appl. No.: 724,875

[22] Filed: Sep. 20, 1976

[51] Int. Cl.² ............................................. G03B 23/02
[52] U.S. Cl. .................................. 242/71.1; 242/197; 352/78 R
[58] Field of Search ...................... 242/197, 198, 71.1, 242/71.2, 71, 192, 210, 195, 55.53; 221/69, 70, 71; 206/409, 408, 387; 352/72, 78 R; 353/26 R

[56] References Cited

U.S. PATENT DOCUMENTS

| 1,347,867 | 7/1920 | Mitten | 242/55.53 |
|---|---|---|---|
| 1,623,505 | 4/1927 | Tessier | 242/71.1 X |
| 2,032,213 | 2/1936 | Howell | 242/71.1 |
| 3,283,886 | 11/1966 | Addis et al. | 221/70 X |
| 3,333,785 | 8/1967 | Baur et al. | 242/71.1 |
| 3,342,431 | 9/1967 | Mouissie | 242/197 |
| 3,536,276 | 9/1970 | Bundschuh et al. | 242/197 X |
| 3,774,309 | 11/1973 | Leopoldi | 206/409 |
| 3,777,997 | 12/1973 | Spiroch et al. | 242/71.1 |

FOREIGN PATENT DOCUMENTS

| 355,963 | 7/1922 | Germany | 242/71.1 |
|---|---|---|---|
| 181,340 | 12/1922 | United Kingdom | 206/409 |

Primary Examiner—George F. Mautz
Attorney, Agent, or Firm—Charles R. Lewis

[57] ABSTRACT

A filmstrip cartridge for use with a complimentary filmstrip projector includes a hood hinged to a film containing housing. The cartridge features spring means to maintain the film in a coiled state during winding and unwinding, a force biased closure means, a film guide channel defined between the hood and the housing having friction reducing means to insure reliable film movement, and an optional positive film movement lock to prevent inadvertent film removal.

24 Claims, 8 Drawing Figures

FILMSTRIP CARTRIDGE

BACKGROUND OF THE INVENTION

1. Field of the Invention

The present invention relates to cartridges for containing a coiled strip of photographic film for storage and/or use with complimentary filmstrip utilizing equipment.

2. Description of the Prior Art

Cartridges of the type designed to hold photographic film have enjoyed wide spread use. A species of film cartridge includes a film supply coil and a film takeup coil in a permanently sealed container. Another species of film cartridge includes only a film supply coil designed to be unwound for use with a filmstrip projector and then rewound into the cartridge. Cartridges of the latter species have included an opening to advance a filmstrip out of or retract a filmstrip into the cartridge, and a hinged cover or separable portion to allow access to and replacement of the film.

While conventional cartridge designs of the latter species have been satisfactory, problems have been encountered in providing a reliable means for the projector operator to urge the film along its path of travel, with reliable closure of the hinged cover or separable portion, and in providing a means to prevent inadvertant film removable from the cartridge.

The present invention provides a filmstrip cartridge having an improved means to allow the projector operator to manually urge the film along its path of travel, and improved means to insure reliable cover closure, and an improved film engaging lock to prevent inadvertant film removable.

BRIEF DESCRIPTION OF THE DRAWINGS

The present invention will be fully understood from consideration of the following detailed description of the preferred embodiment taken in conjunction with the accompanying drawings, in which like reference characters refer to like structure in the several views, and wherein.

DETAILED DESCRIPTION OF THE PREFERRED EMBODIMENT

Figure 1:
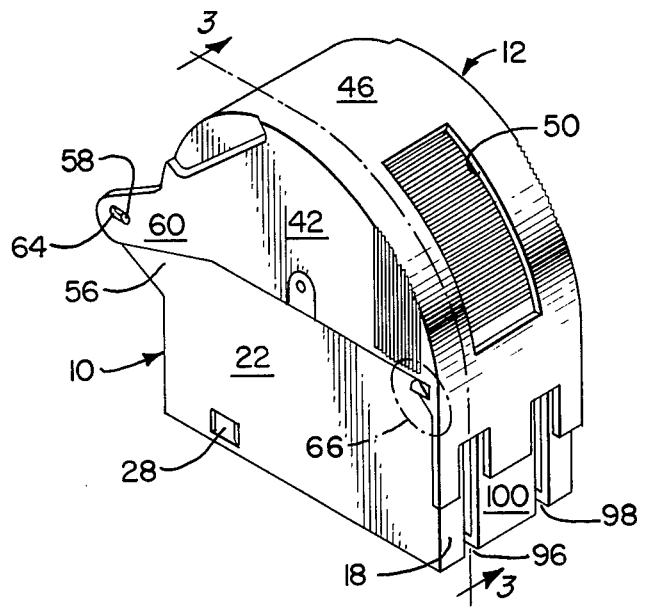
FIG. 1 is a front perspective view of a filmstrip cartridge incorporating the present invention.
Figure 2:
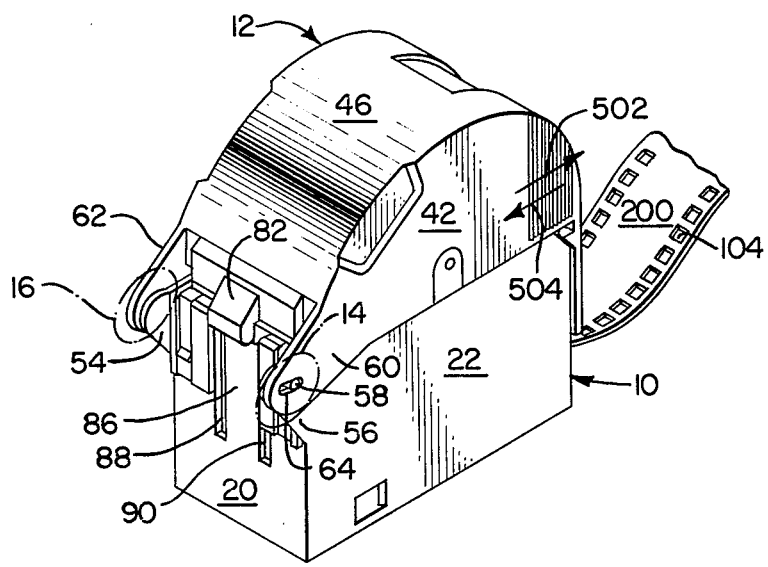
FIG. 2 is a rear perspective view of the filmstrip cartridge shown in FIG. 1.

A filmstrip cartridge in accordance with the present invention is shown in perspective view in FIG. 1 and FIG. 2, and includes a housing 10 hinged to a complimentary hood 12 by hinges shown in the encircled areas 14 and 16 of FIG. 2. The cartridge is preferrably molded from a plastic material using mass production techniques to produce a low cost component. The cartridge is suitable for use with a filmstrip projector of the type described in copending patent application Ser. No. 724,881, filed Sept. 20, 1976 and assigned to the assignee of the present invention. The projector described therein is adapted to project an image formed from a strip of photographic film onto a viewing screen. The projector includes a cavity adapted to receive a filmstrip cartridge of the type described herein.

Figure 3:
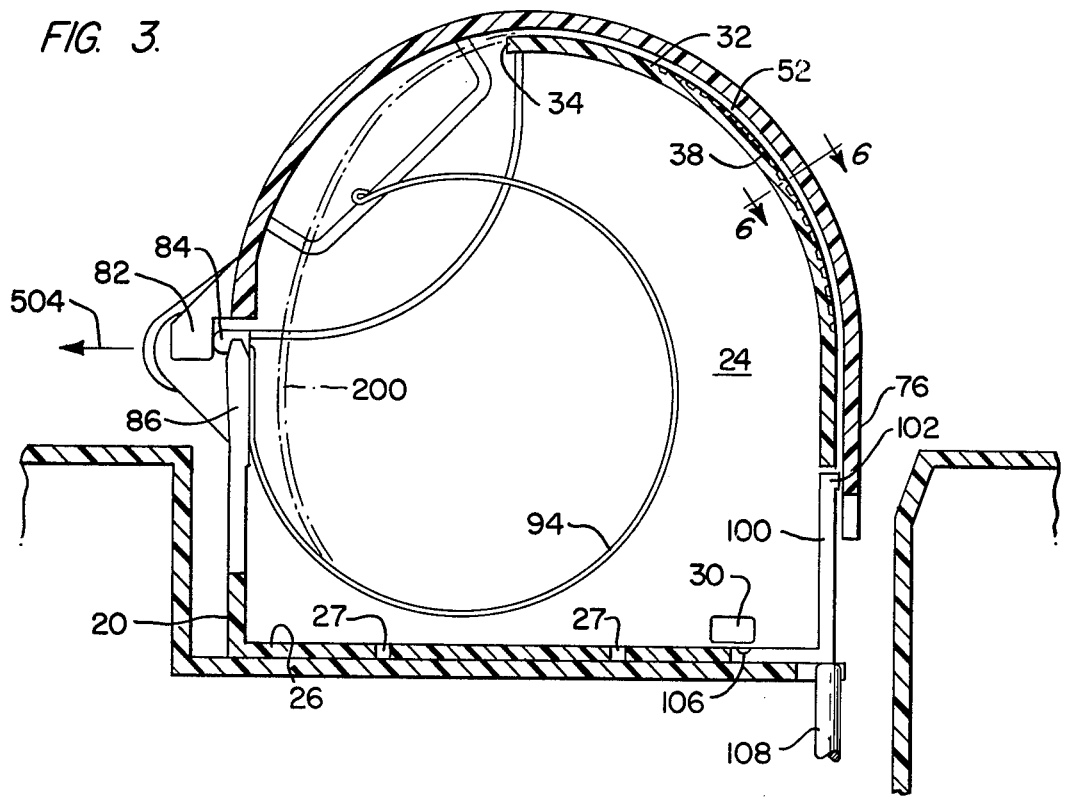
FIG. 3 is a cross section side elevation view of the filmstrip cartridge shown in FIG. 1 taken along the line 3—3.
Figure 4:
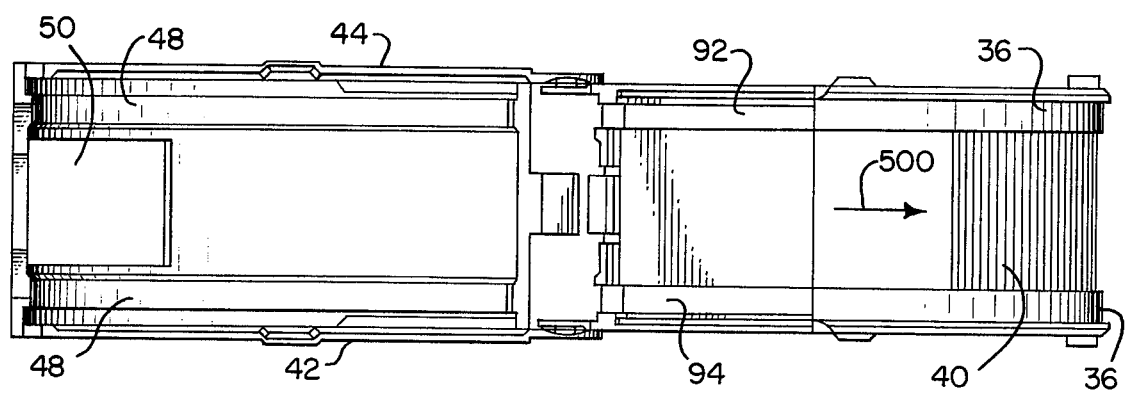
FIG. 4 is a top plan view of the filmstrip cartridge in the open position.
Figure 6:
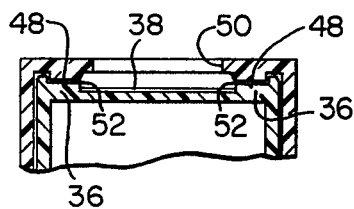
FIG. 6 is a cross section view of a portion of the filmstrip cartridge shown in FIG. 3 taken along line 6—6.
Figure 7:
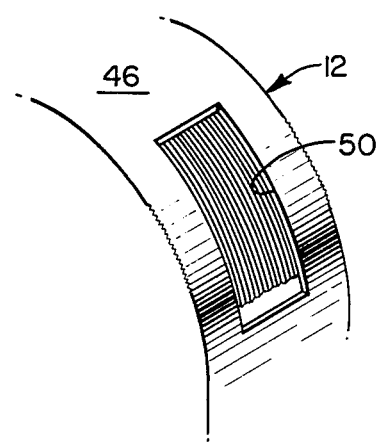
FIG. 7 is a partial perspective view of a filmstrip cartridge showing a ridge pattern different from that shown in FIG. 1.
Figure 8:
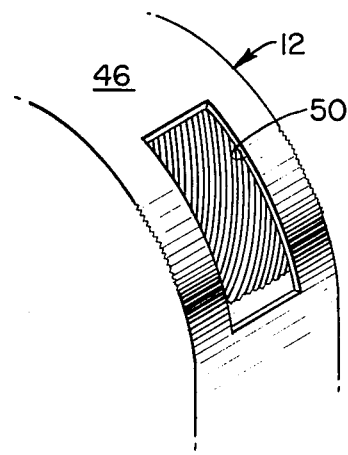
FIG. 8 is a partial perspective view of a filmstrip cartridge showing a ridge pattern different from that shown in FIG. 1 and FIG. 7.

As best seen in the several views, the lower portion of the housing 10 is formed as a parallelipiped with a forward wall 18, a rear wall 20, spaced generally coplanar, sidewalls 22 and 24 (FIG. 3), and a bottom 26 (FIG. 3). The bottom 26 may be formed with one or more holes 27 adapted to engage complimentary locating or guide pins (not shown) on the projector structure. An aperture 28 is formed in the side wall 22 toward the rear of the cartridge (FIG. 1 and FIG. 2), and another aperture 30 (FIG. 3) is formed in the side wall 24 toward the front of the cartridge. The apertures 28 and 30 cooperate with a cartridge latching means described in co-filed patent application Ser. No. 724,882, filed Sept. 20, 1976, the disclosure of which is incorporated herein by reference. The positions and dimensions of the holes 27 and the apertures 28 and 29 are exemplary. Other combinations of holes and/or apertures may be utilized to guide, lock, or latch the cartridge into the projector. A curved wall 32 joins the two sidewalls 22 and 24 to give the upper portion of the cartridge a curved profile as shown in cross section view of FIG. 3. The curved wall 32 commences at the front wall 18 and terminates at a edge 34. An opening for loading and unloading film 200 (shown issuing from the cartridge in FIG. 2) is defined between the edge 34 and the rear wall 20. First guide surfaces 36 (as shown in FIG. 4) are provided by the raised exterior lateral portions of the curved wall 32. A side view of the film guide surfaces 36 is not shown in FIG. 3 for reasons of clarity. As explained in further detail below, the film 200 is positioned along the surfaces 36 and travels along its longitudinal axis as represented by the arrow 500 in FIG. 4. A series of spaced ridges 38 are formed on the exterior side of the curved wall 32 to collectively provide a serrated region 40. The ridges 38, as shown in FIG. 4 and FIG. 6, are aligned in a direction transverse to the longitudinal axis 500 of the film 200. The transverse alignment is merely exemplary. The distal end or tips of the ridges 38 terminate below the first film guiding surfaces 36. This elevation difference is clearly shown on the right side of FIG. 4 and in FIG. 7. The ridges 38 may be formed parallel to (FIG. 7) or at an angle to (FIG. 8) the longitudinal axis 500 of the film 200. The ridges constitute a friction reducing means whose function is described below. Structure other than ridges may also be utilized. Such other structure may include raised dot or bump patterns.

The hood 12 has substantially coplanar sidewalls 42 and 44 (FIG. 4). A curved wall 46 joins the two sidewalls 42 and 44 to give the hood 12 the curved profile shown in FIG. 3. Second guide surfaces 48 are provided by the raised interior lateral portions of the curved wall 46 of the hood 12 (FIG. 4). A finger opening 50 is formed in the curved wall 46. When the hood 12 is closed onto an empty housng 10, as in FIG. 1, the serrated region 40 is accessible through the opening 48.

With the cartridge in the closed position, the first guide surfaces 36 cooperates with the second guide surfaces 48 to provide a film 200 guide channel 52. The film 200 guide channel 52 is shown in cross section in FIG. 6.

A hinge 14 and another hinge 16 couple the housing 10 to the hood 12. Integrally formed extensions 54 and 56 project rearward from the housing 10. A stub shaft 58 is integrally formed with the extension 56 and extends substantially normal therefrom. Likewise, another stub shaft (not shown) is integrally formed with the extension 54 and extends substantially normal therefrom. Hood extensions 60 and 62 project rearward from the hood 12. An elongate slot 64 (shown only in hood extension 60) is formed in each extension 60 and 62. Each stub shaft 58 passes through its respective slot 64 to complete the hinges 14 and 16. The use of the slots 64 in each hinge 14 and 16 permits the hood 12 to be rotated about the hinges 14 and 16, as well as provide a limited degree of translational freedom for the hood 12 along the major axis of the slot 64.

The cartridge hood is maintained in the closed position through the agency of snap closures located at the front of the cartridge and a force bias means located at the rear of the cartridge urging the hood toward the rear of the cartridge. The use of force biased closures allows the cartridge to be reliably closed even though the cartridge may undergo a change in shape or dimension because of material aging, mishandling, and temperature or humidity changes.

Figure 5:
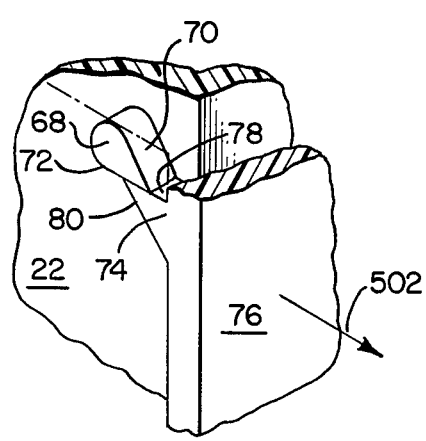
FIG. 5 is perspective view of a closure means utilized with the filmstrip cartridge shown in FIGS. 1 through 4.

A snap closure is shown in encircled area 66 of FIG. 1 and in detail in FIG. 5. Another snap closure (not shown) is located on the other side of filmstrip cartridge. Both snap closures operate in an identical manner. Referring to FIG. 5, a sector shaped lug 68 is integrally formed with each housing 10 sidewall 22 and 24 and extends laterally outward therefrom. Each lug 68 has an upper surface 70 and a lower surface 72. A tab 74 is integrally formed at each side of the forward depending extension 76 of the curved wall 46 of the hood 12. Each tab 74 is so located as to readily engage its respective lug 68. As with the lug 68, each tab 74 has an upper surface 78 and a lower surface 80. As the hood 12 is closed onto the housing 10, the lower surface 80 of each tab 74 rides against its respective upper surface 70 of each lug 68 until the upper surface 78 of each tab 74 snaps under and locks against their respective lower surfaces 72. The caming action of the lower surface 80 of the tabs 74 against the upper surfaces 70 of the lugs 68 causes the hood 12 to be displaced in a forward direction, as indicated by the arrow 502 (FIG. 2), relative to the housing 10. The elongate slot 64 in each hood extension 60 and 62 permits this movement.

A projection 82 and a follower 84 formed on the distal end of a resilient leaf 86 constitute a force bias means which provides a force to maintain the hood 12 and the housing 10 in the closed position. The projection 82 is best seen in perspective in FIG. 2 and in cross section in FIG. 3. The projection 82 has a curved profile and is integrally formed with the rear portion of the curved wall 42 of the hood 12. A resilient leaf 86 is formed in the rearwall 20 between two generally parallel spaced slots 88 and 90 (FIG. 2). The follower 84 is formed at the distal end of the leaf 86 and is adapted to bear against the curved surface of the projection 82. When the hood 12 is closed over the housing 10 as in FIG. 1, the projection 82, the follower 84, and the resilient leaf 86 combine to force the hood 12 in the direction of the arrow 504. In this way the force bias means in the rear wall 20 cooperate with the closure means at the forward end of the cartridge to maintain the cartridge in a closed state.

As described above, the preferred embodiment uses a force bias means in the rear wall 20 cooperating with a closure means at the forward end of the cartridge to maintain the cartridge in the closed position. To open the cartridge the hood 12 is manually urged in the direction of the arrow 502 and rotated about its hinges 14 and 16. Once open the filmstrip may be readily removed and replaced. In those situations where it is desired to permanently maintain the cartridge in the closed position, holes (not shown) may be formed in the hood 12 sidewalls 42 and 44 in registration with corresponding holes in the housing 10 sidewalls 22 and 24. Threaded fasteners or rivets may then be used to secure the hood 12 to the housing 10.

Two curved leaf springs 92 and 94, which are formed from flat spring steel stock, are provided in the housing 10 to maintain the filmstrip 200 in the coiled state. The leaf springs 92 and 94 have the curved profile shown in FIG. 3. One end of each leaf spring 92 and 94 is secured to the rear wall 20 of the housing 10 and the other end extends into the interior of the housing 10. The leaf springs 92 and 94 cradle the filmstrip 200 coil (not shown) in the interior of the curve with a radially inward force to maintain the film 200 in a coiled state during winding and unwinding. An exemplary portion of film 200 leading from the springs 92, and 94 to the film guide channel 52 is shown in FIG. 3 (broken line illustration).

The preferred embodiment of the cartridge is adapted to utilize filmstrip having serial perforations along one or both margins, as well as filmstrip without margin perforations. Where the cartridge uses filmstrip having serial perforations along one or both margins an optional film movement lock (FIGS. 1 and 3) may be provided to prevent inadvertent withdrawal of the filmstrip from the cartridge. The forward wall 18 and the forward portion of the bottom wall 26 have two slots 96 and 98 formed therein to define an upstanding resilient leaf 100 therebetween. A nub 102 (FIG. 3) is formed at the distal end of the leaf 100 and extends outward therefrom in a forward direction. As shown in the side elevation view of FIG. 3, the nub 102 has a rectangular profile. Configurations other than rectangular may also be utilized. The nub 102 is located in line with the perforations 104. The dimensions of the nub 102 are preselected to permit the nub 102 to readily enter one of the perforations 104 (FIG. 2) located on the margin of the film 200. A flexure joint 106 is formed in the leaf 100 where it joins the bottom wall 26. The flexure joint 106 provides a means to control the resiliency of the leaf 100. A resiliency is selected which urges the leaf 100 and the nub 102 in a forward direction toward the forward depending extension 76. In this way the nubs 102 is urged through one of the perforations 104 to arrest or lock the film 200 against longitudinal movement.

The film 200 is unlocked when the cartridge is loaded into the projector. A pin 108 mounted on the projector structure (FIG. 3) contacts the bottom wall 26 of the cartridge where it merges with the upstanding leaf 100 and urges the leaf 100 toward the rear of the cartridge, away from the forward depending extension 76. The nub 102 is thereby extracted from the perforation 104 to unlock the film 200 and permit longitudinal movement of the film 200 in the film guide channel 52.

In the preferred embodiment a single nub 102 at the distal end of the resilient leaf 100 is utilized to lock a perforation 104 on one side of the film 200. In an alternate embodiment (not shown), a second nub may be formed at the distal end of the resilient leaf 100 and utilized to lock a perforation on the other side of the film 200. In this alternate embodiment, both side of the film 200 would be simultaneously locked or unlocked.

In order to load a coiled filmstrip 200 into the cartridge, the hood 12 is manually forced in the direction arrow 502 against the force provided by the projection 82, the follower 84 and the resilient leaf 100 to disengage the tabs 74 from the lugs 68. The hood 12 is then rotated about its hinges 14 and 16 to open the cartridge. A filmstrip coil is inserted into the interior of the housing 10 to be cradled by the curved leaf springs 94 and 96. The leading edge of the film 200 is positioned along the first film guide surfaces 36 and the hood 12 rotated about its hinges 14 and 16 to close the cartridge.

When the cartridge is in operating engagement with a filmstrip projector, the film 200 is caused to be advanced along its longitudinal axis through the film guide channel 52. Support for the lateral margins of the film is provided by the guide surfaces 36 and by the guide surfaces 48. The median portion of the film 200, which bears the image information, does not normally come into contact with the serrated region 40 during the advancement of the film 200 by the film projector. However, when the film cartridge 10 is loaded into the projector, it is necessary that the film 200 be manually advanced so that the leading edge of the film 200 moves into engagement with the film 200 advancing means in the projector. In order to manually advance the film 200, the projector operator uses a finger, e.g., the forefinger, to push the film 200 accessible through the finger opening 50. When the film 200 is manually urged along the film guide channel 52, the median portion of the film 200 is depressed to come into contact with the serrated region 38. The serrated region 38 reduces the area of contact between the median portion of the film 200 and the cartridge 10, effectively reduces the friction drag between the film 200 and the serrated region 38 during manual loading. The friction between the projector operator's finger and the film 200 is thereby made reliably larger then the friction between the cartridge 10 and film 200. Thus, the serrated region 38 provides a means to insure reliable and efficient film 200 loading. Also, the spaces between adjacent ridges 36 serve to collect particles of dust and other contamination to minimize the probability of film 200 scratching.

As described above, the present invention provides a filmstrip cartridge which overcomes drawbacks of conventional filmstrip cartridges by providing friction reducing means to insure reliable film winding and unwinding, a optional positive film lock to prevent inadvertent film removable, improved force biased closures, and means to maintain the film in a coiled state. These features are provided in a cartridge which can be formed from a plastic material using mass production techniques to provide a low cost component.

As will be apparent to those skilled in the art, various changes and modifications may be made to the preferred embodiment of the invention described herein without departing from the scope of the claimed invention.

I claim:
1. An improved filmstrip cartridge comprising:
a filmstrip cartridge having a film guide channel:
whereby filmstrip may be guided along its longitudinal axis into and out of said filmstrip cartridge;
said film guide channel terminating with a film opening through which said filmstrip may be guided along its longitudinal axis into and out of said filmstrip cartridge;
said film guide channel having a first surface portion opposite a second surface portion;
a pair of laterally spaced apart first film guide surfaces on said first surface portion of said film guide channel;
a pair of laterally spaced apart second film guide surfaces on said second surface portion of said film guide channel;
said first and said second film guide surfaces providing support for the lateral margins of said filmstrip; and
the space between said second film guide surfaces having a finger opening formed therein and
means providing a reduced area of film contact on said first surface in the space between said first film guide surfaces to reduce the friction between said film and said first surface;
said reduced area of film contact in registration with said opening;
whereby said filmstrip may be manually advanced along said film guide channel by pushing said filmstrip accessible through said finger opening with a finger.
2. The improved filmstrip cartridge recited in claim 1 wherein said means providing a reduced area comprises:
a plurality of ridges defining a serrated region.
3. The improved filmstrip cartridge recited in claim 1 wherein:
said pair of laterally spaced apart first film guide surfaces are raised above said first surface portion of said film guide channel.
4. The improved filmstrip cartridge of claim 2 wheren;
the distal end of said ridges terminate between said first surface portion and said raised first film guide surfaces.
5. The filmstrip cartridge claimed in claim 2 wherein:
said ridges are disposed transverse to the longitudinal axis of the film.
6. The filmstrip cartridge claimed in claim 2 wherein:
said ridges are disposed parallel to the longitudinal axis of the film.
7. The filmstrip cartridge claimed in claim 2 wherein:
said ridges are disposed oblique to the longitudinal axis of the film.
8. The cartridge claimed in claim 1, further comprising:
means to arrest the longitudinal movement of said filmstrip in said film guide channel.
9. The cartridge claimed in claim 8, wherein:
said filmstrip includes perforations along at least one margin and
said means to arrest the longitudinal movement of said film further comprises:
a resilient leaf having one end secured to the housing;
a nub formed at the other end of said resilient leaf;
said nub capable of penetrating a one of said perforations;
said nub moveable to a first position in which said nub penetrates a one of said perforations to arrest the longitudinal movement of said film; and said nub moveable to a second position out of engagement with said perforation.

10. The cartridge claimed in claim 9, wherein:
said resilient leaf urges said nub toward said first position.

11. A filmstrip cartridge for filmstrip comprising:
a housing having a pair of laterally spaced apart first film guide surfaces formed on a surface portion thereof;
a hood hinged to said housing and having a pair of laterally spaced apart second film guide surfaces formed on a surface portion thereof;
said first film guide surfaces facing said second film guide surfaces and defining a film guide channel there between through which filmstrip may be advanced along its longitudinal axis;
said film guide channel terminating in a film opening through which said filmstrip may be guided along its said longitudinal axis into and out of said filmstrip cartridge;
said hood having a finger opening formed therein in the space between said second guide surfaces, and
means providing a reduced area of film contact on said first surface in the space between said first film guide surfaces to reduce the friction between said film and said first surface;
said reduced area of film contact in registration with said opening;
whereby said filmstrip may be manually advanced along said film guide channel by pushing said filmstrip accessible through said finger opening with a finger.

12. The improved filmstrip cartridge recited in claim 11 wherein said means providing a reduced area comprises;
a plurality of ridges defining a serrated region.

13. The improved filmstrip cartridge recited in claim 11, wherein:
said pair of laterally spaced apart first film guide surfaces are raised above said first surface portion of said film guide channel.

14. The improved filmstrip cartridge of claim 12 wherein;
the distal end of said ridges terminate between said first surface portion and said raised first film guide surfaces.

15. The filmstrip cartridge claimed in claim 12 wherein:
said ridges are disposed transverse to the longitudinal axis of the film.

16. The filmstrip cartridge claimed in claim 12 wherein:
said ridges are disposed parallel to the longitudinal axis of the film.

17. The filmstrip cartridge claimed in claim 12 wherein:
said ridges are disposed oblique to the longitudinal axis of the film.

18. The filmstrip cartridge claimed in claim 11 further comprising:
a curvelinear leaf spring having one end secured to said housing;
the other end of said spring extending into said housing;
whereby a coil of filmstrip may be cradled by said spring to maintain the filmstrip in the coiled state.

19. The filmstrip cartridge claimed in claim 11 further comprising:
closure means at the forward end of the cartridge;
force bias means at the rear of said cartridge;
whereby the forced bias means cooperates with the closure means to maintain the hood in the closed relation with the said housing.

20. The filmstrip cartridge claimed in claim 19, wherein said force bias means further comprises:
a projection having a curved surface secured to said hood;
a resilient leaf having its proximal end secured to said housing;
a projection following surface secured to the distal end of said resilient leaf; and
said resilient leaf urging said projection following surface against said curved surface of said projection.

21. The filmstrip cartridge claimed in claim 11 wherein:
said housing includes an aperture for engagement with complimentary cartridge latching structure.

22. The cartridge claimed in claim 11 further comprising:
means to arrest the longitudinal movement of said filmstrip in said film guide channel.

23. The cartridge claimed in claim 22 wherein said filmstrip includes perforations along at least one margin and said means to arrest the longitudinal movement of said film further comprises:
a resilient leaf having one end secured to the housing;
a nub formed at the other end of said resilient leaf;
said nub capable of penetrating a one of said perforations along the margin of said filmstrip;
said nub moveable to a first position in which said nub penetrates a one of said perforations to arrest the longitudinal movement of said film; and
said nub moveable to a second position out of engagement with said perforation.

24. The cartridge claimed in claim 23, wherein:
said resilient leaf urges said nub toward said first position.

* * * * *